J. GRAVENSTINE.
BAKING-PAN HANGINGS.

No. 185,226.  Patented Dec. 12, 1876.

Witnesses: J. R. Massey, Frank H. Massey.

Inventor: John Gravenstine

UNITED STATES PATENT OFFICE.

JOHN GRAVENSTINE, OF PHILADELPHIA, PENNSYLVANIA.

IMPROVEMENT IN BAKE-PAN HANGINGS.

Specification forming part of Letters Patent No. 185,226, dated December 12, 1876; application filed November 23, 1876.

*To all whom it may concern:*

Be it known that I, JOHN GRAVENSTINE, of the city and county of Philadelphia, in the State of Pennsylvania, have invented new and useful Improvements in Baking-Pan Hangings, which improvements are fully set forth in the following specification, reference being had to the accompanying drawings.

The object of my invention is to furnish an improved device for holding baking-pans firmly in their places when one is to be hung within another, so as to leave a free space around it, and to be easily removable.

Figure 1:
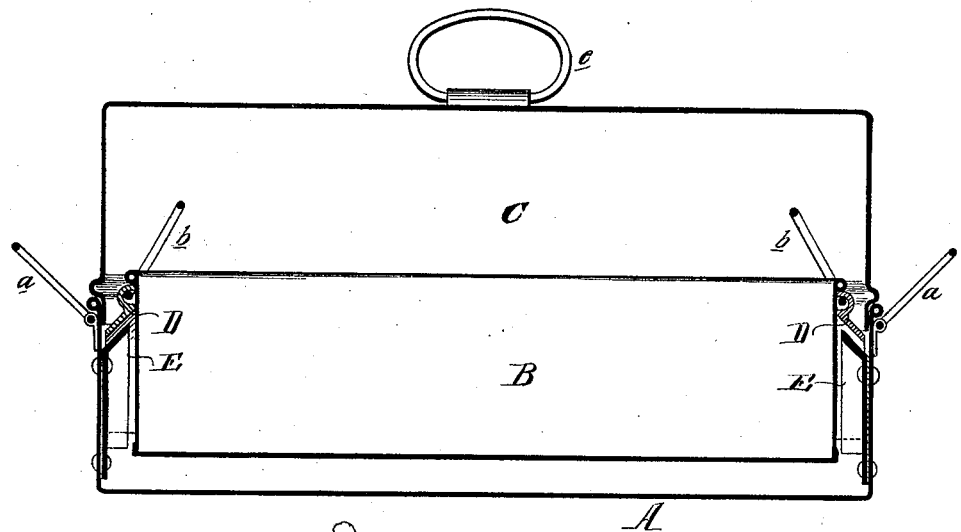
Figure 2:
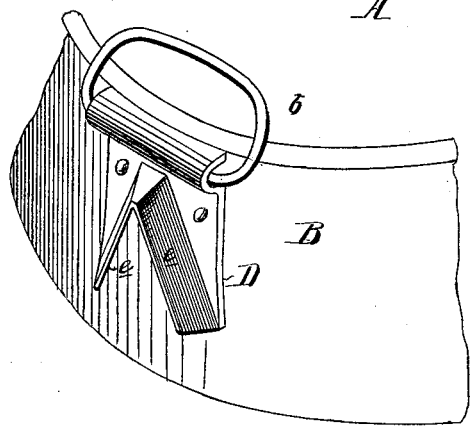
Figure 3:
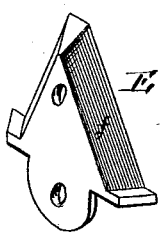

Figure 1 is a vertical transverse section of two pans, connected, and the inside one suspended, by my device. Figs. 2 and 3 show the respective parts of my device in perspective, with the first part, attached to the pan B, broken away.

A is the lower part of the outside pan, which is furnished with a deep and closely-fitted removable cover, C, and having a common ring-handle, c. The body of the pan also has like handles, a a. B is the inside pan, suspended by two pairs of my hangings, one at each end, so as to leave a free space beneath and around it. D is the first part of my improved device as a pan-hanger; and it combines in one piece a pair of claws, e e, for interlocking and resting upon its counterpart E below, and having a half-round groove widthwise at its top, which embraces the wire ring-handle b. E is an A-shaped piece, with a dovetail face, f. It is riveted upon the inside of the pan A—the outside pan.

When the pan B is dropped into A the two parts of my device interlock by a dovetail fitting, and the pan B will not slip off or out of place. While the parts are peculiarly easy of introduction in dropping the pan B into A, and hold in the directions desired with all the strength of their metal, they separate in the vertical direction perfectly easily, as desired.

I claim—

The pan B, provided with the hanger D, having claws e e for its lower part, and a half-round groove, grasping the handle b, for its upper part, in combination with the pan A, provided with the supporting-piece E, having a dovetail face, f, substantially as and for the purpose herein set forth.

JOHN GRAVENSTINE.

Witnesses:
J. R. MASSEY,
FRANK H. MASSEY.